(12) United States Patent
Benoit

(10) Patent No.: US 9,446,633 B2
(45) Date of Patent: Sep. 20, 2016

(54) ELASTIC VEHICLE TIRE

(75) Inventor: Kristof Benoit, Waregem (BE)

(73) Assignee: RECTICEL N.V., Brussels (BE)

( * ) Notice: Subject to any disclaimer, the term of this patent is extended or adjusted under 35 U.S.C. 154(b) by 0 days.

(21) Appl. No.: 13/696,359

(22) PCT Filed: May 2, 2011

(86) PCT No.: PCT/EP2011/056969
§ 371 (c)(1),
(2), (4) Date: Nov. 6, 2012

(87) PCT Pub. No.: WO2011/138282
PCT Pub. Date: Nov. 10, 2011

(65) Prior Publication Data
US 2013/0048181 A1    Feb. 28, 2013

(30) Foreign Application Priority Data
May 7, 2010   (DE) .................... 20 2010 005 400 U

(51) Int. Cl.
*B60C 5/00*       (2006.01)
*B60C 19/00*      (2006.01)

(52) U.S. Cl.
CPC ............. *B60C 19/002* (2013.04); *B60C 5/002* (2013.01); *Y10T 152/10495* (2015.01)

(58) Field of Classification Search
CPC ......... B60C 5/00; B60C 5/002; B60C 19/12; B60C 19/122
See application file for complete search history.

(56) References Cited

U.S. PATENT DOCUMENTS 3,405,217 A   10/1968   Garrett et al.
3,423,338 A    1/1969   Sutton
3,425,890 A    2/1969   Powers
4,371,023 A *  2/1983   Campagna ..................... 152/158
4,670,477 A    6/1987   Kelly et al.
5,479,974 A    1/1996   Noggle et al.
7,980,358 B2 * 7/2011   Soltau ................... B60R 13/083
                                               181/204
2003/0188817 A1  10/2003  Yukawa et al.
(Continued)

FOREIGN PATENT DOCUMENTS

DE         30 42 350 A1     5/1982
DE   20 2008 009 008.3 U1   7/2008
(Continued)

OTHER PUBLICATIONS

Machine translation of FR 2390301, 1979.*
(Continued)

*Primary Examiner* — Justin Fischer
(74) *Attorney, Agent, or Firm* — Polson Intellectual Property Law, PC; Margaret Polson

(57) ABSTRACT

The invention relates to an elastic vehicle tire (1) comprising a tire cavity. Said cavity is enclosed by a running strip (2) supporting the tread surface (3) and a side wall (4, 4.1) formed on each side of the running strip (2). A noise dampening insert (9) or a noise dampening insert arrangement disposed therein is provided in the tire cavity. A ventilation layer (13) having a structure permeable to air at least in the transverse and/or longitudinal direction of the running strip (3) is disposed between the noise dampening insert (9) or noise dampening insert arrangement and connected to the inner side (10) of the running strip (2) supporting the running surface (3). Said layer is suitable for passing an air flow at least partially in contact with the inner wall (10) of the running strip (2).

16 Claims, 10 Drawing Sheets

(56) References Cited

U.S. PATENT DOCUMENTS

| | | |
|---|---|---|
| 2006/0108038 A1 | 5/2006 | Ishida |
| 2008/0099116 A1 | 5/2008 | Tanno |
| 2009/0151836 A1 | 6/2009 | Ikeda et al. |
| 2009/0277553 A1 | 11/2009 | Tanno et al. |
| 2010/0018622 A1 | 1/2010 | Tanno et al. |

FOREIGN PATENT DOCUMENTS

| | | | |
|---|---|---|---|
| EP | 870631 | * | 10/1998 |
| EP | 2 123 491 A1 | | 11/2009 |
| EP | 2123491 A1 | | 11/2009 |
| EP | 2123490 | | 8/2012 |
| FR | 2390301 | * | 1/1979 |
| JP | 62-216803 | | 9/1987 |
| JP | 2-84320 | * | 3/1990 |
| JP | 8-207508 | * | 8/1996 |
| JP | H08-207508 A | | 8/1996 |
| JP | 2003252003 A | | 9/2003 |
| JP | 2004-82822 | * | 3/2004 |
| JP | 2004-082947 A | | 3/2004 |
| JP | 2005-104314 A | | 4/2005 |
| JP | 2005205934 A | | 8/2005 |
| JP | 2006-044503 A | | 2/2006 |
| JP | 2006-151028 A | | 6/2006 |
| JP | 2007-99162 | * | 4/2007 |
| JP | 2007-230544 A | | 9/2007 |
| JP | 2008302757 A | | 12/2008 |
| JP | 2009-023548 A | | 2/2009 |
| JP | 2009-040145 A | | 2/2009 |
| JP | 2009137568 A | | 6/2009 |
| JP | 2009243113 | * | 10/2009 |
| JP | 2009292461 A | | 12/2009 |
| WO | 2004050392 A1 | | 6/2004 |
| WO | WO 2004/050392 | * | 6/2004 |
| WO | 2010000789 A1 | | 1/2010 |

OTHER PUBLICATIONS

Machine translation of JP 8-207508, 1996.*
Machine translation of JP 2004-82822, 2004.*
Machine translation of JP 2007-99162, 2007.*
Machine translation of EP 870631, 1998.*
English Translation of the International Search Report for International Application No. PCT/EP2011/056969 mailed Aug. 4, 2011.
English Translation of the International Preliminary Report on Patentability—Chapter II for International Application No. PCT/EP2011/056969 completed May 10, 2012 with practitioners response.
First office action dated Sep. 30, 2014 in related Chinese application 201180022112.1.
Office action dated Mar. 5, 2013 in related Japanese application 2013-508458.
Office action dated Sep. 10, 2014 in related Mexican application MX/a/2012/012957.
Notice of Allowance dated Mar. 4, 2015 in related Mexican application MX/a/2012/012957.
Third Party Observation dated Jun. 2, 2015 in related Japanese application 2013-508458.
Examination report dated Apr. 30, 2015 in related Russian application 2012141834/11.

* cited by examiner

US 9,446,633 B2

ELASTIC VEHICLE TIRE

CROSS REFERENCE APPLICATIONS

This application is a National Stage entry of PCT/EP2011/056969 filed May 2, 2011 which claims priority from German application number 20 2010 005 400.1 filed May 7, 2010.

BACKGROUND

The invention relates to an elastic vehicle tire having a tire cavity which is enclosed by a running strip supporting the tread surface and a side wall formed on each side of the running strip and having at least one noise dampening insert arranged in the tire cavity or one noise dampening insert arrangement arranged in the tire cavity.

Such vehicle tires are used in motor vehicles, trailers and semitrailers, and they are also referred to as vehicle pneumatic tires. These tires are cushion tires whose stability is achieved primarily by air pressure introduced into the cavity. The cavity of such a vehicle tire is formed by a running strip supporting the tread surface. The side walls abut against said running strip on both sides. The side walls each support, at their free end a bead for mounting the tire on a wheel rim which rests against the rim well as well as the rim edge. In the case of tubeless tires, the bead rests sealingly against the rim edge or the rim well, so that the cavity formed by the vehicle tire is closed off by the rim.

Rolling noises are generated by the tire tread pattern on the tread surface when the tread surface is rolled on a paved road surface. The resonance oscillations that are responsible for the rolling noises are conveyed as air-borne sound to the environment and as solid-borne sound through the wheel, the vehicle wheel suspension and the car body to the interior of the vehicle. In order to reduce the rolling noise, and particularly the resonance oscillations, vehicle tires have been developed which have an insert or a corresponding insert arrangement for noise dampening. These noise dampening inserts are typically arranged on the inner side of the running strip. Additionally, the inserts can also extend at least partially along the side walls. Foam inserts are often introduced into the tire cavity as noise dampening inserts. As described in DE 30 42 350 A1, they are connected to the inner side of the tire either by gluing, or by vulcanization. DE 20 2008 009 008 U1 discloses a vehicle tire with a viscoelastic foam insert as noise dampening insert.

Although noise damped vehicle tires are desirable, particularly for reasons pertaining to environmental compatibility, these tires have not yet experienced a widespread introduction on the market. One of the reasons is that the tires heat up during rolling, particularly when taking curves. Even though a certain amount of heating of the running strip with its tread surface is advantageous in order to increase the adhesion to a paved road surface, its wear increases with increased heating of the tire. However, in the case of noise damped tires, heating of the running strip is often above an acceptable level. Consequently, the wear of such a tire is increased in comparison to a tire without noise dampening. It is assumed that the reason for stronger heating in noise damped tires is that the noise dampening foam insert on the inner side of the running strip acts as a thermal insulator, preventing or eliminating the radiation of heat into the internal space of the tire. In order to counter this disadvantage of noise damped vehicle tires, it has been proposed to incorporate heat conducting particles in the foam insert to create a heat conducting path from the inner wall of the tire through the noise dampening insert to the tire cavity, as described in JP 2005-104314 A and JP 2007-230544 A. In contrast, DE 20 2008 009 008 U1, proposes to incorporate microencapsulated phase transition material as latent heat storage material in the foam insert, in order to postpone the time when the tire reaches its still admissible peak temperature. In this conception, heat is consumed by the phase transition of this material. In this manner, temperature peaks during driving operation can be buffered with regard to tire heating.

These solutions for removing heat from the inner side of the running strip of the tire have the disadvantage that additional material has to be incorporated in the foam, adding to the weight of the noise dampening foam insert. Moreover, during the manufacture of the foam insert, one must ensure that the incorporated particles are arranged such that the desired heat removal from the inner side of the running strip occurs as intended. Consequently, the particles used to form the desired heat removal paths have to abut against each other throughout the noise dampening layer. It has been found that the manufacture of foams with such incorporated particles is often problematic.

The foregoing example of the related art and limitations related therewith are intended to be illustrative and not exclusive. Other limitations of the related art will become apparent to those of skill in the art upon a reading of the specification and a study of the drawings.

SUMMARY

Proceeding from the discussed prior art, the invention is therefore based on the problem of further developing a noise damped vehicle tire of the type mentioned in the introduction and in accordance with the preamble in such a manner that an effective heat removal from the inner side of the running strip is possible, while avoiding or minimizing the indicated disadvantages of the prior art.

This problem is solved according to the invention by a vehicle which has a ventilation layer placed between the noise dampening insert or the noise dampening insert arrangement (collectively referred to as noise damping insert), which is connected to the inner side of the running strip supporting the tread surface. The ventilation layer extends in the peripheral direction of the running strip and has a structure through which air can flow at least in the transverse and/or longitudinal direction of the running strip, and which allows the passage of an air flow which is at least partially in contact with the inner wall of the running strip.

In the disclosed vehicle tire, a ventilation layer is connected to the inner side of the running strip and has at least some transverse extent and is arranged in the radial direction between the inner side of the running strip and a noise dampening insert. A path through which air can flow is created by the ventilation layer, so that the inner side of the running strip is air cooled, at least in the area of the ventilation layer. For this purpose, the ventilation layer extends in the peripheral direction of the running strip. The ventilation layer can extend continuously over the entire periphery of the inner side of the running strip. It is also possible to divide the inner peripheral surface of the running strip into individual ventilation layer segments, so that a noise dampening insert arrangement is formed in this manner. The ventilation layer is designed so that an air flow flowing through it can absorb and remove heat from the inner wall into the tire cavity. For this purpose, the air flow can absorb heat directly from the inner side of the running strip—that is to say from the rubber surface—or from a thermally conducting layer which is in contact with the inner side of the running strip, such as a metal foil. In order to generate a heat removing air flow through the ventilation layer, the latter is connected in an appropriate manner to the inner side of the running strip of the wheel. Thus, the concept of connectedness subsumes all embodiments by means of which this state is achieved. The connection of the ventilation layer to the inner side of the running strip can be achieved, for example, by the application of the ventilation layer to the inner side of the running strip. It is equally possible to use a partial bracing of said layer on the inner side of the running strip. It is also possible to connect the ventilation layer by adhesion to the inner side of the running strip. As already indicated, the above-mentioned connection possibilities merely represent some embodiment examples.

According to an additional embodiment, the ventilation layer is segmented just like the noise dampening layer, and the individual elements are arranged with a separation from each other. This allows an exchange between the air moved in the ventilation layers and the air present in the tire interior. This allows thermal control of the running strip as the inner side of the running strip is cooled with this configuration.

The deformation of the tire while rolling on a substrate is used to generate an air flow for cooling the inner side of the running strip. The tire deformation while the tire is rolling on the substrate, during which deformation the running strip is successively pressed peripherally inward, and after leaving or being lifted the substrate, it is deformed back to its original position, is used in connection with the present air cooling to generate an air flow through the ventilation layer. The tire deformation functions in the manner of a peristaltic pump. Depending on the design and the geometry of the ventilation layer and the noise dampening insert, the air flow in the ventilation layer is generated directly by the above-described tire deformation during rolling, or such an air flow is generated in the remaining tire cavity which itself is in a connection with the ventilation layer that allows air flow. A combination of the two above-described basic air flow generation mechanisms is also possible. If air flow generation is desired directly in the ventilation layer, the latter typically has elastic properties. According to the other principle, due to availability of the described paths the peristaltism of the tire generates the air flow in the remaining cavity, which flows into the ventilation layer. The ventilation layer is connected to the inner side of the running strip to successively elastically deform the ventilation layer by rolling the tire in the above-described manner, and as a result trigger a pumping effect in the ventilation layer. Then, a deformation of the running strip can be transferred to the ventilation layer.

The ventilation layer can be connected directly to the inner side of the running strip. It is also possible to provide a thermally conducting layer, for example, a metal meshwork, which is attached to the inner side of the running strip. It is entirely possible to maintain the thermally conducting layer, if it comprises openings, applied against the tire inner side by the ventilation layer.

Thus, the ventilation layer can be arranged on the thermally conducting layer. The cooling effect can be strengthened by means of such a thermally conducting layer, because as a result of said layer, heat removal can occur from the inner side of the running strip in the direction of the side walls, and preferably also along the inner sides of the side walls. Typically, such a heat conducting layer opens into a remaining tire cavity into which the heat is radiated. A material that conducts heat well is used to form the heat conducting layer. A metal meshwork or a perforated metal foil can be used. It is also conceivable to use a continuous metal foil.

The thermally conducting layer can also be used for tethering or connecting the ventilation layer to the inner side of the tire. This succeeds if the thermally conducting layer is connected to the tire inner side, on the one side, and to the ventilation layer, on the other side by using an adhesive, an adhesive layer, or by a vulcanization process. A rubber strip of required width with a thermally conducting core is suitable for this purpose, for example. This core can be configured as a meshwork, a nonwoven, a foil or the like with thermally conducting properties. It is also possible for the core to be formed by thermally conducting particles that are embedded in a matrix.

In the above described concept of air cooling some or all of the inner side of the running strip, heat is removed effectively from the inner surface by the air flow. Air cooling is particularly effective if the ventilation layer is connected to the remaining cavity of the tire that allows an air exchanging air flow, allowing an exchange of heat by way of the mixing of the air flows. The ventilation layer can be in connection with the remaining cavity of the tire such that said layer itself delimits the remaining cavity with its lateral surfaces. It is also possible for the noise dampening insert itself to be held inside the ventilation layer, and thus to not come in contact with the inner wall of the running strip and/or side walls. However, it can be appropriate to brace the noise dampening insert in some sections against the inner side of the tire depending on the design of the ventilation layer and the noise dampening. It is also possible to use designs in which the noise dampening insert has perforations to allow air flow.

The above explanations clarify that the ventilation layer is a layer that allows an air flow and which separates the noise dampening insert at least largely from the inner wall of the tire. The above-described air cooling and the associated capacity to allow air to flow between the inner side of the tire and the noise dampening insert also allows the side of the noise dampening insert that faces the inner side of the running strip is also used for the purpose of noise dampening for the first time. This causes an increase in the surface area of the noise dampening insert that is effective. As a result, both the thermal properties and the noise dampening properties are improved in this vehicle tire. Consequently, in order to achieve an equal noise dampening effect in a vehicle tire with a ventilation layer as described above, the noise dampening insert can be designed to be smaller, and thus be of lower weight.

The heat releasing surface of the inner side of the running strip can be increased by the application of the ventilation layer on the inner side of the running strip supporting the tire tread, if the material used for the construction of the ventilation layer at least partially exhibits good heat-conducting properties. In that case, the material used to construct the ventilation layer acts at least partially in the manner of a cooling body that is applied to the heat releasing inner side of the running strip, which allows the heat to be released over a larger surface area to the air flow.

A layer produced from metal fibers is a material that is a good heat conductor, such as, a nonwoven metal fiber or a metal mesh.

In another embodiment, the ventilation layer is produced from an open pore material, wherein the pore cavity is sufficiently large for the purpose of allowing the desired air flow. Such an open pore layer as ventilation layer can be produced using a plastic and/or metal honeycomb structure, so-called hump profile structure mats or the like, for example. In a preferred embodiment example, an open pore foam, particularly an open pore polyurethane foam, is used as open pore material. Reticular foams can also be used, produced as a reticular polyurethane foam, for example. Particles that are good heat conductors, for example, the already mentioned metal fibers, can be incorporated in such a foam. If the noise dampening insert is a foam body, it could be possible to produce the ventilation layer from a foam as well, since the layer can then be produced from the same base material. The above-described thermally conducting design of the ventilation layer can also be combined with a thermally conducting layer arranged on the inner side of the running strip, as already described above.

In connection with these designs, it must be understood that the ventilation layer has substantially no noise dampening properties and that air can substantially not flow through the noise dampening insert. The notion that air throughflow is substantially not possible means that the noise dampening insert, if it has an open pore design, cannot be referred to as impermeable to air, but that this air permeability is nonetheless not sufficient to meet the requirements for air flow that is provided in order to cool the inner side of the running strip.

Preferably, the ventilation layer extends peripherally along the inner side of the running strip. Here, one or more mutually parallel ventilation layers are used. They can have a straight or also a meandering course.

The ventilation layer which is the subject matter of the present invention thus is a layer through which a path allowing air to flow through is generated between a noise dampening insert and the inner side of the tire. It is provided that the air flow flows at least partially along the inner side of the running strip of the vehicle tire. A ventilation layer is considered suitable if it has an air permeability that is preferably greater than 500 L/min over a cross-sectional area of 1 dm$^2$, measured according to EN/ISO 9237. It is preferable to use ventilation layers that have an air through-flow capacity of more than 1000 L/min over a cross-sectional area of 1 dm$^2$. It is understood that higher air permeabilities are preferred. When using a ventilation layer formed by a reticular foam, values of 5000 L/min or more over a cross-sectional area of 1 dm$^2$ can also be achieved. The above-mentioned measurements are carried out on samples having a thickness of 1 cm.

The thickness of the ventilation layer also has an effect on the effectiveness of the air flow generated for the purposes of cooling the inner side of the running strip of the tire. The thickness of the ventilation layer is also a function of the geometry and of the size of the tire. The required thickness for such a ventilation layer is also influenced by the air permeability of the ventilation layer. This means that a ventilation layer having a higher air permeability can in principle have a smaller thickness than such a layer with lower air permeability. Taking into consideration these specifications, ventilation layers having thicknesses of 0.5 cm can be formed. However, the thickness of such a ventilation layer typically is 1.5-3 cm. In tests, satisfactory results have been achieved with ventilation layers having a thickness of 2 cm and an air permeability of 3000-4000 L/min over a cross-sectional area of 1 dm$^2$.

It is possible for the ventilation layer and/or the noise dampening insert or the noise dampening insert arrangement to have a means to create turbulent flow of the air conveyed through the ventilation layer to further improve the cooling of the inner side of the running strip. For example, one can use extensions here on the side faces of the ventilation layer and/or on the noise dampening insert. Openings (perforations) produced in the insert and/or the ventilation layer, typically by punching out, can also be used for this purpose. At the same time, due to the described measures, the surface area of the insert is increased, which improves the noise dampening.

Investigations on tires without noise dampening insert, tires with such an insert, and tires according to this invention have shown that, in tires with the ventilation layer according to the invention between the inner side of the running strip and the noise dampening insert, it is not possible to completely prevent a stronger heating than in tires that have no noise dampening insert at all. However, this heating is moderate in comparison to the heating of tires with a noise dampening insert but without ventilation. In tires according to the invention, a heating of only 50% or less was observed, in comparison to the heating of a tire having the same noise dampening insert but no ventilation layer.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
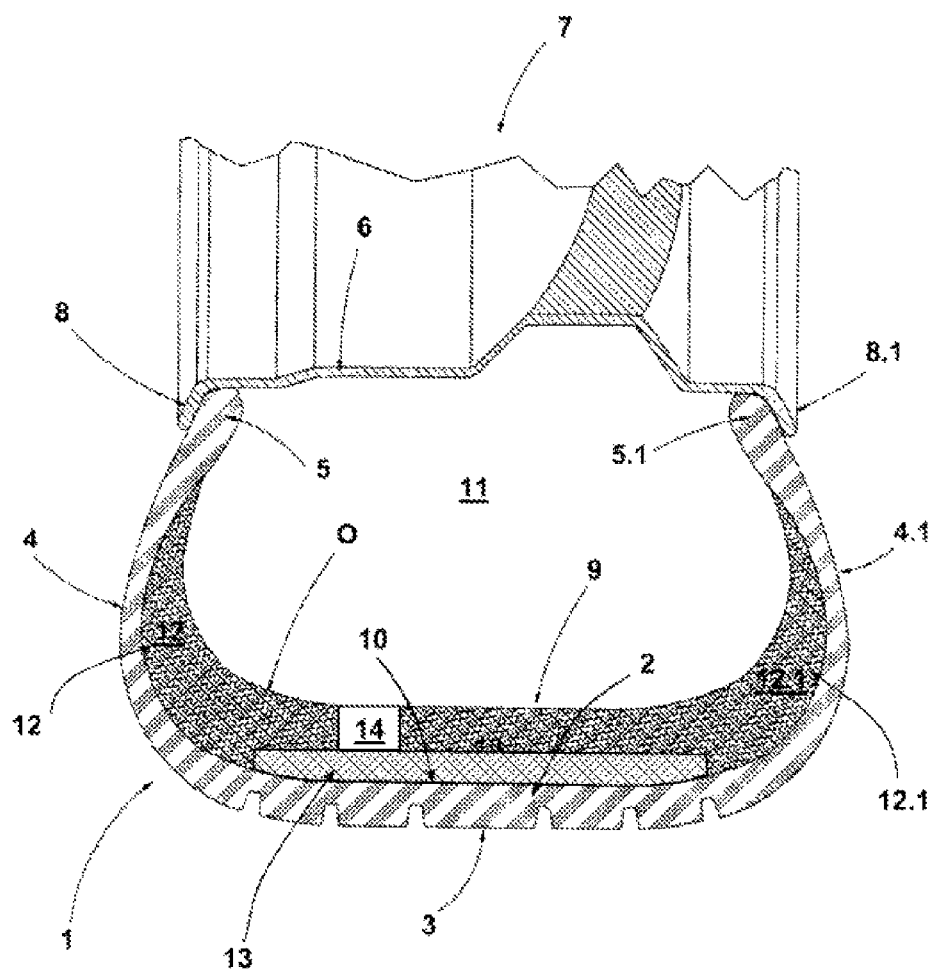
Figure 1 is a diagrammatic cross section through a vehicle tire with a noise dampening insert and a ventilation layer according to a first embodiment, and mounted on the rim of a wheel.

Referring first to FIG. 1, a vehicle tire 1 made of rubber or of a rubber mixture comprises a running strip 2 whose outer side forms the tire tread 3 of the vehicle tire 1. Two side walls 4, 4.1 are formed on the running strip 2. Each of the side walls 4, 4.1 supports a bead 5, 5.1 on its end. For the sake of simplicity, the vehicle tire 1 is shown without reinforcement and without carcass. Similarly, the bead core typically contained in the beads 5, 5.1 is not represented. The vehicle tire 1 in FIG. 1 is mounted on the rim 6 of a wheel 7. The beads 5, 5.1 are applied against the rim well, and they are pushed by the tire inner pressure with their beads 5, 5.1 against the respective abutting rim edge 8, 8.1.

A viscoelastic foam insert marked overall with reference numeral 9 is arranged in the vehicle tire 1. The foam insert 9 is adhesively connected to the inner side 10 of the vehicle tire 1 where the foam insert 9 is applied directly on the inner side 10 of the tire 1. The foam insert 9, which is connected to the vehicle tire 1, thus also rotates during a rotation of the vehicle tire 1. The foam insert 9 fills approximately 30% of the cavity 11 of the vehicle tire 1 formed by the running strip 2 and the side walls 4, 4.1. In the depicted embodiment, the foam insert 9 follows the inner contour of the vehicle tire 1. The thickness of the foam insert 9 is greater in the area of the running strip 2 than in the abutting side wall sections 12, 12.1, in which the foam insert 9 thins out in the direction of the beads 5, 5.1. With their surface delimiting the cavity 11, the side wall sections 12, 12.1 extend at least partially parallel to, or at a slight angle of inclination with respect to, the inner surface of the vehicle tire 1.

The foam insert 9 is used to damp the resonances of the enclosed volume of air, in combination with a high dampening capacity, particularly in a frequency range below 400 Hz, and particularly in a frequency range between 200 and 250 Hz. The depicted geometry of the foam insert 9, with its base section and the side wall sections 12, 12.1, clearly shows that an oscillation dampening of the elastic vehicle tire 1 occurs not only in the area of the running strip 2, but also in the area of the side walls 4, 4.1. Overall, the foam insert 9 thus has a U-shaped design.

Due to the foam insert 9, the tire cavity originally available in the vehicle tire 1 is reduced. Therefore, in the context of these explanations, the tire cavity 11 that remains is also referred to as remaining tire cavity.

A ventilation layer 13 is enclosed by the noise dampening foam insert 9. The ventilation layer 13 is located between the inner side 10 of the running strip 2 and the foam insert 9. In the depicted embodiment, the ventilation layer 13 is designed as an open pore foam portion, enabling an air flow in it that flows at least partially past the inner side 10 of the running strip 12. The ventilation layer 13 has no appreciable noise dampening properties. On the other hand, there is almost no air flow or at least not enough air flow through the foam insert 9. The ventilation layer 13 is used to remove heat from the inner side 10 of the running strip 2 during the rolling process of the tire 1. The elastic work of the vehicle tire 1 is exploited, as is the fact that the heat production is a consequence of the deformation work generated while rolling on a substrate and the associated deformation, while the tire 1 is air cooled in its remaining sections, also as a result of the rotation. For example, mutually offset perforations 14 are advantageously produced in the foam insert 9, in order to allow an exchange of air flow between the air located in the cavity 11 of the tire 1 and the air flow generated in the ventilation layer 13. As a result, the removal of heat from the inner side 10 of the running strip 2 in order to cool the latter is improved, in comparison to a design without perforations. For this purpose, the perforations 14 have a sufficiently large cross section to allow throughflow. At the same time, the number of the perforations 14 is sufficiently large to allow air circulation between the cavity 11 and the ventilation layer 13. For this purpose, air can flow through the ventilation layer 13 equally in all directions.

The introduction of perforations into the ventilation layer 13 in addition increases the usable surface area of the foam insert 9 for the desired dampening purposes, since the lateral areas of the perforations 14 are noise or resonance dampening.

Figure 2A:
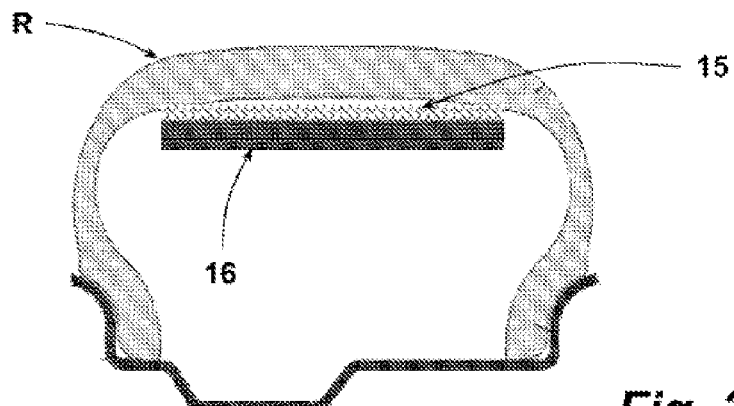
FIGS. 2a-2c are basic representations of additional embodiment examples of a noise damped vehicle tire provided with a ventilation layer.
Figure 2B:
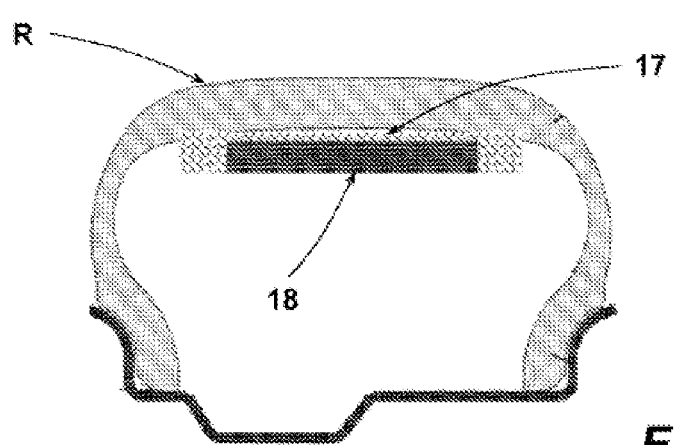
Figure 2C:
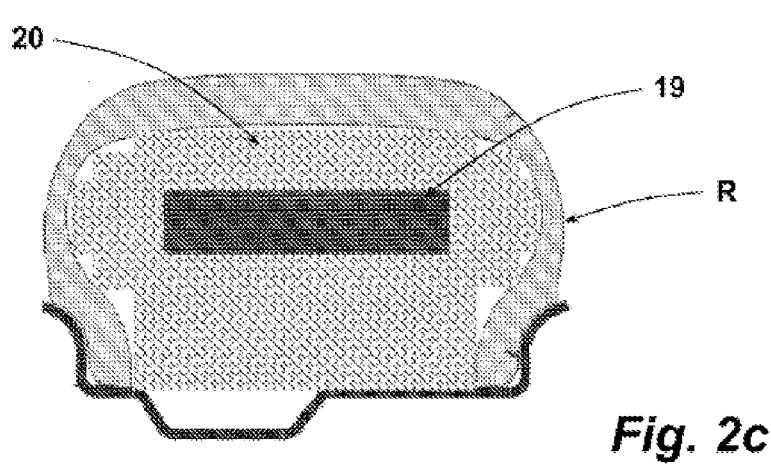

Additional embodiments of various arrangements of noise dampening inserts and ventilation layers are shown diagrammatically, in FIGS. 2a-2c In the embodiment ing FIG. 2a, the ventilation layer 15 with its lateral closing-off portion extends to the lateral closing-off portion of the noise dampening insert 16. In this design, the remaining cavity of the vehicle tire R is also delimited by portions of the ventilation layer 15. Consequently, the latter is in direct air exchange with the tire cavity.

The situation is the same in the embodiment example of FIG. 2b. In this example, the ventilation layer 17 extends laterally around the noise dampening insert 18.

In the embodiment example of FIG. 2c, the noise dampening insert 19 as a whole is accommodated in a ventilation layer 20. In this embodiment, the entire cavity of the tire R is substantially filled with the material of the ventilation layer 20. In a design where the noise dampening insert is supported either supported by or enclosed in the materials forming the ventilation layer, and where the ventilation layer extends at least over the entire width of the tire cavity, the unit formed by the ventilation layer and the noise dampening insert can be held in a form-fitting and/or force-fitting connection inside the tire. In this design, the unit does not have to be glued to the inner side of the tire. The unit is designed so that its width is broader than the width of the inner space of the tire, and it is thus held in this direction under a certain preliminary stress in the standing position between the side walls of the tire. A rotational entrainment of the material of the ventilation layer and thus also of the dampening insert is ensured due to this force-fitting connection. In this design one can dispense with an adhesive layer between the inner side of the vehicle tire and the ventilation layer, which improves the cooling effect correspondingly. Alternatively, or also complementarily to this, a force-fitting application of the unit formed by the ventilation layer or ventilation material and the noise dampening insert in the radial direction can exist as well.

In principle, as long as it is ensured that a sufficient air flow for the desired heat removal can flow through it, various materials are suitable for different designs of a ventilation layer. In the described embodiment examples, the ventilation layer is produced from an open pore reticular polyurethane foam. This is used only as supporting body to keep open a path through which air can flow on the inner side 10 of the running strip 2.

Figure 3A:
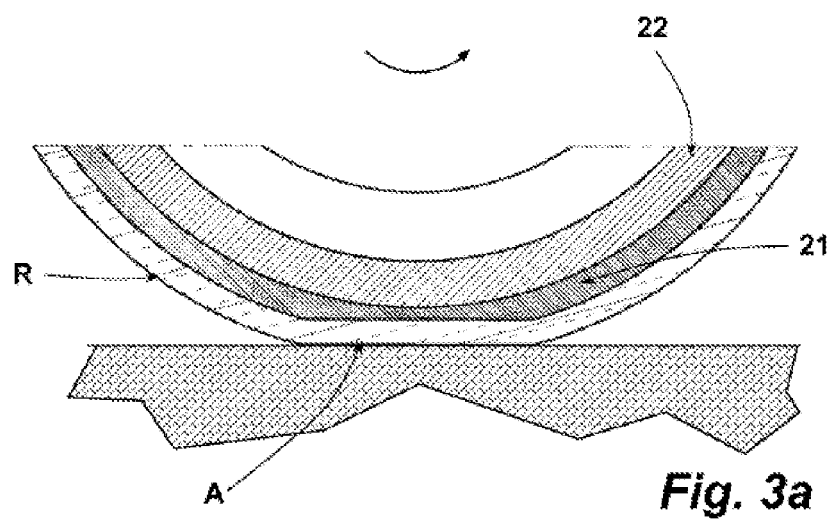
FIGS. 3a, 3b are basic representations of a noise damped vehicle tire provided with a ventilation layer, in a longitudinal cross section of its respective lower section.
Figure 3B:
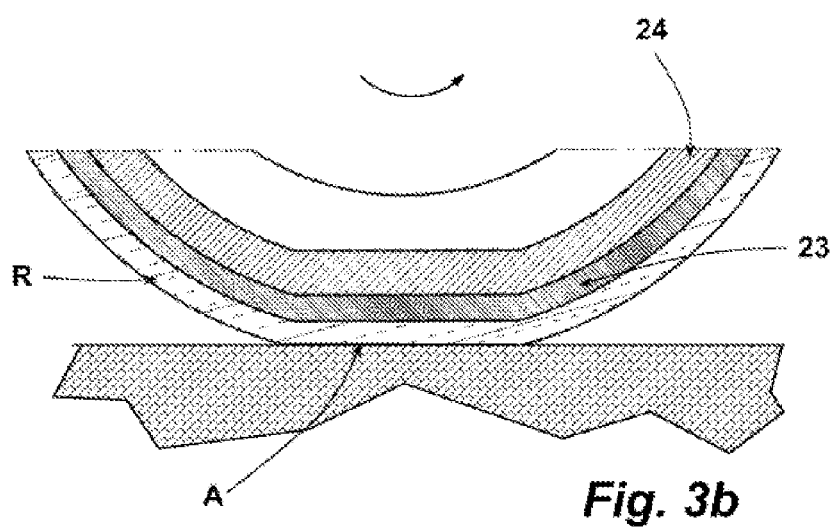

For the generation of the already previously described air-cooling air flow on the inner side 10 of the running strip 2, the deformation of the tire R during rolling is used, as shown in FIGS. 3a and 3b. FIG. 3a shows a design in which the ventilation layer 21 through which air can flow can be deformed more easily than the noise dampening insert applied to it on the inner side. Due to the deformation of the tire R in the area of its footprint A formed in the peripheral direction depending of the speed of rotation, the ventilation layer 21 is pushed in peripherally, and thus there is a reduction in terms of its cross-sectional area that allows free throughflow. Due to the rotation of the tire R, an air flow is generated in this manner within the ventilation layer 21, in particular based on the principle of a peristaltic pump. Due to the air flow, the heat that is generated in the area of the respective deformation of the ventilation layer 21 is removed immediately, in particular to cooler areas of the tire. Alternatively, in the case where the noise dampening insert 22 has perforations, or the ventilation layer 21 is open in the direction transverse to the rotation direction, air exchange and its corresponding heat removal occurs with the air contained in the tire interior. Thus, due to the peripheral deformation of the ventilation layer 21 as the tire R rotates, the heat is removed immediately after its generation by the air flow on the inner side 10 of the running strip 2 in the area of the deformation. Excessive heating due to heat accumulation is thus effectively prevented.

FIG. 3b shows a ventilation layer 23 which, relative to the noise dampening insert 24 abutting against it, is pressed inward together with said layer during the rolling process of the tire R. In this embodiment example as well, an air flow is generated within the tire R according to the principles of a peristaltic pump. In this embodiment example, the ventilation layer 23 is in a flow exchange with the air contained in the tire interior, so that air also flows in this manner through the ventilation layer 23.

Figure 4:
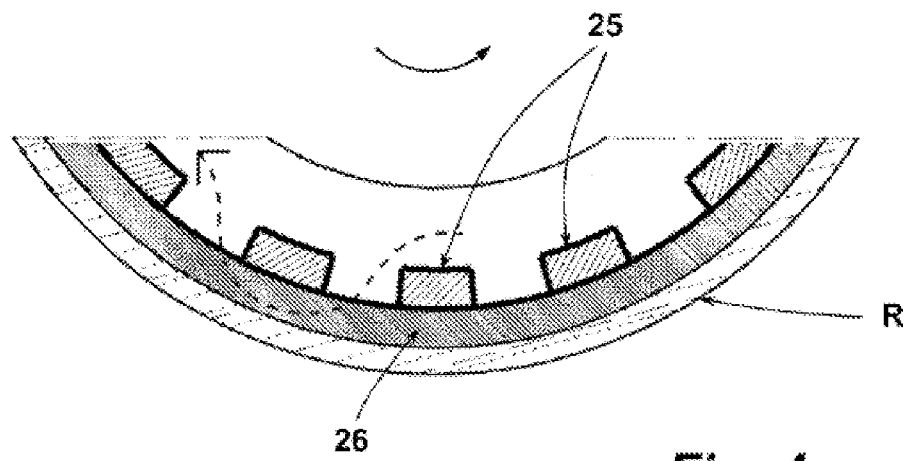
FIG. 4 is a representation corresponding to that of FIGS. 3a, 3b, with an additional embodiment of a noise dampening insert and of a ventilation layer.

FIG. 4 shows an additional embodiment where a noise dampening insert arrangement 25 is arranged on a continuous ventilation layer 26. In this design, the noise dampening insert arrangement is formed by a plurality of mutually separated, individual noise dampening inserts. In this manner, an air flow within the ventilation layer 26, and through the area between said inserts due to the separation between the individual noise dampening inserts and into the remaining tire cavity is possible. In the depicted embodiment, the noise dampening inserts have a rectangular design. They can also have other geometric cross sections, for example, triangular, or the cross section of a quarter of a circle. In the design of FIG. 4, the noise dampening inserts can be impermeable to air. It is also possible to use a design in which the noise dampening inserts of the noise dampening insert arrangement 25, which are set on the ventilation layer 26, are also permeable to air, particularly also to a reduced extent compared to the ventilation layer 26.

Figure 5:
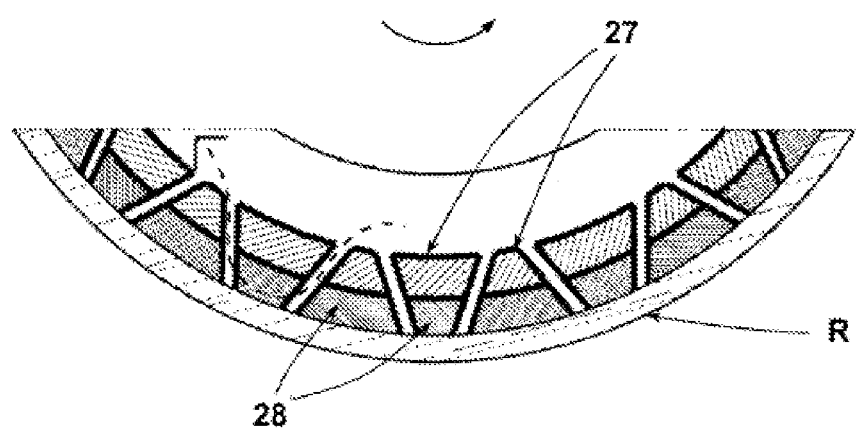
FIG. 5 is a representation according to that of FIG. 4, with an additional embodiment of a ventilation layer with a noise dampening insert arranged thereon.
Figure 5A:
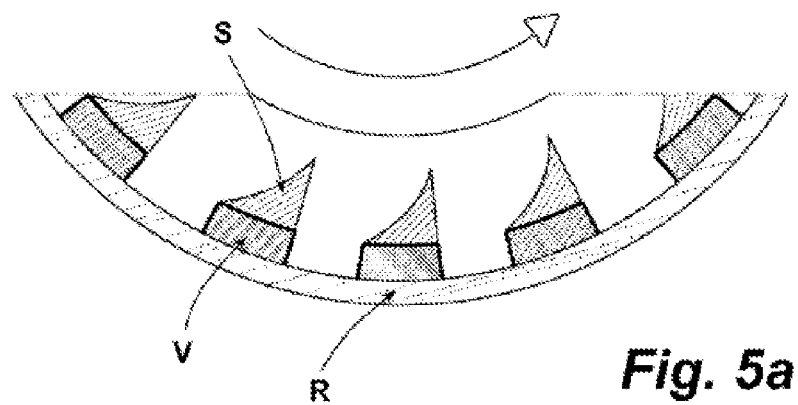
FIGS. 5a, 5b are additional embodiments of a ventilation layer with a respective noise dampening insert.
Figure 5B:
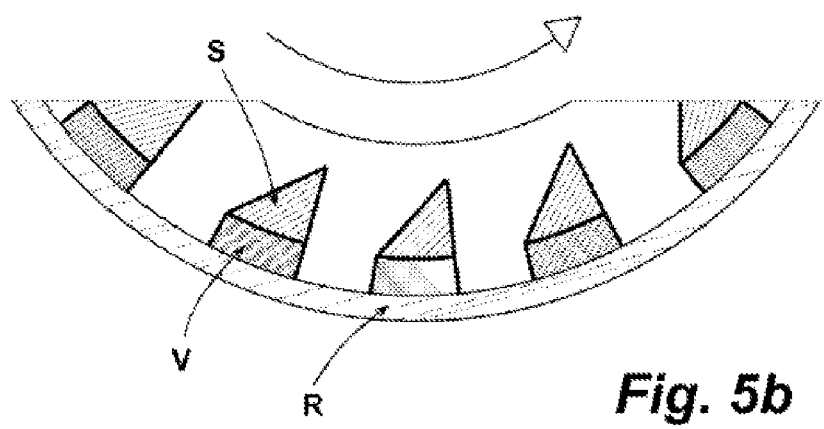

FIG. 5 shows an additional embodiment where not only the noise dampening insert 27, but also the ventilation layer 28 is segmented. The geometric arrangement of the individual segments shown in FIG. 5, each consisting of a section of the ventilation layer 28 and a section of a noise dampening insert 27, is an example. In this regard as well, the mutually separated segments can have different cross-sectional shapes, and they can also be arranged with a different separation from each other. Examples of this are shown in FIGS. 5a and 5b. Here, the tire is marked with the reference numeral R, the ventilation layer with V, and the noise dampening insert with S.

Figure 6:
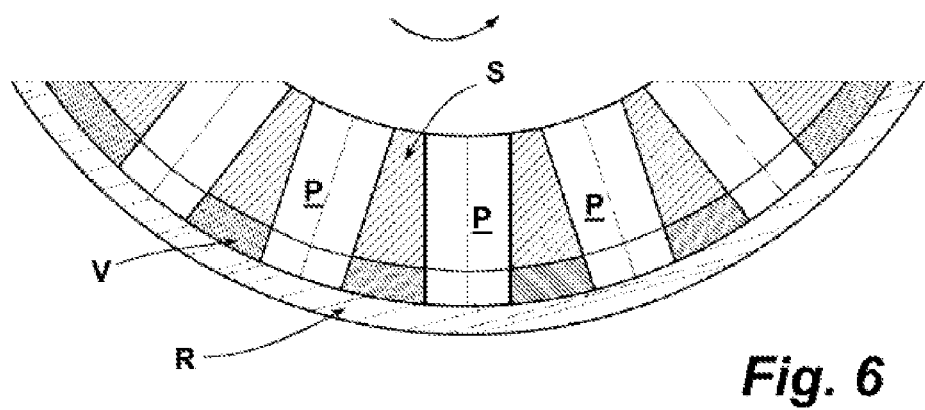
FIGS. 6, 6a, 6b are additional embodiments of a ventilation layer with a respective noise dampening insert arranged thereon, in a cross-sectional representation corresponding to that of FIG. 5 (FIG. 6) as well as in a top view on the inner side of the running strip (FIG. 6a) and in a variant (FIG. 6b).
Figure 6A:
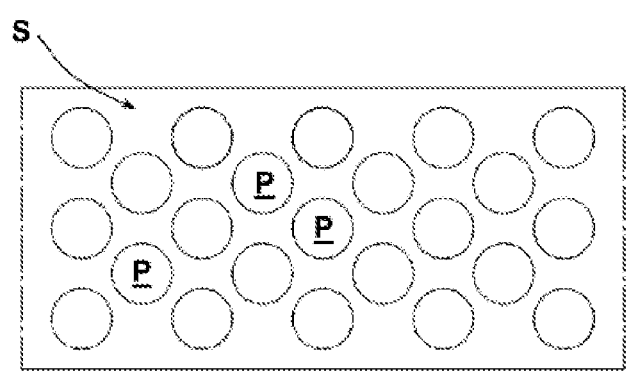
Figure 6B:
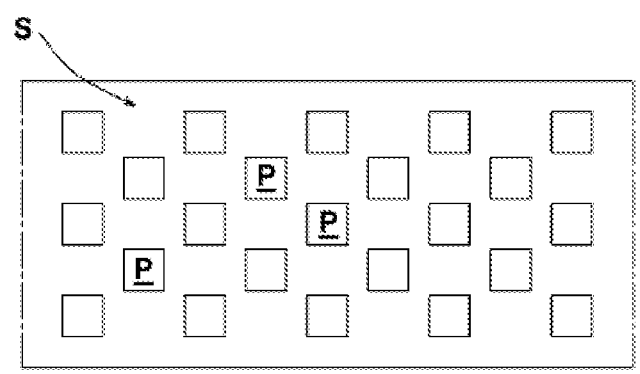

FIG. 6 shows an additional embodiment of a ventilation layer V which is inserted in an elastic tire R and connected to the inner side of its tire tread, and which has a noise dampening insert S arranged thereon. The body formed by the ventilation layer V and the noise dampening insert S is perforated by openings P produced therein, in particular up to the inner side of the running strip of the tire. In the depicted embodiment, the openings have a cross-sectional area that remains the same. In the top view of FIG. 6a, showing the top side of the noise dampening insert S, which faces the cavity of the tire R, one can see that the openings have a circular cross-sectional geometry. Alternative cross-sectional geometries are also possible, such as a square cross-sectional geometry, as shown in FIG. 6b, for example.

In the embodiment shown in FIG. 6, the openings P are in mutual alignment through the noise dampening insert S and through the ventilation layer V, typically using a stamping process. According to another embodiment, the openings of the noise dampening insert can also be arranged with offset relative to those of the ventilation layer, even to the extent that the openings in the ventilation layer are covered completely by a section of the noise dampening insert, and thus are not in direct connection with the tire cavity. In this embodiment, the ventilation layer and the noise dampening insert are perforated independently of each other before their connection.

Figures 7A, 7B:
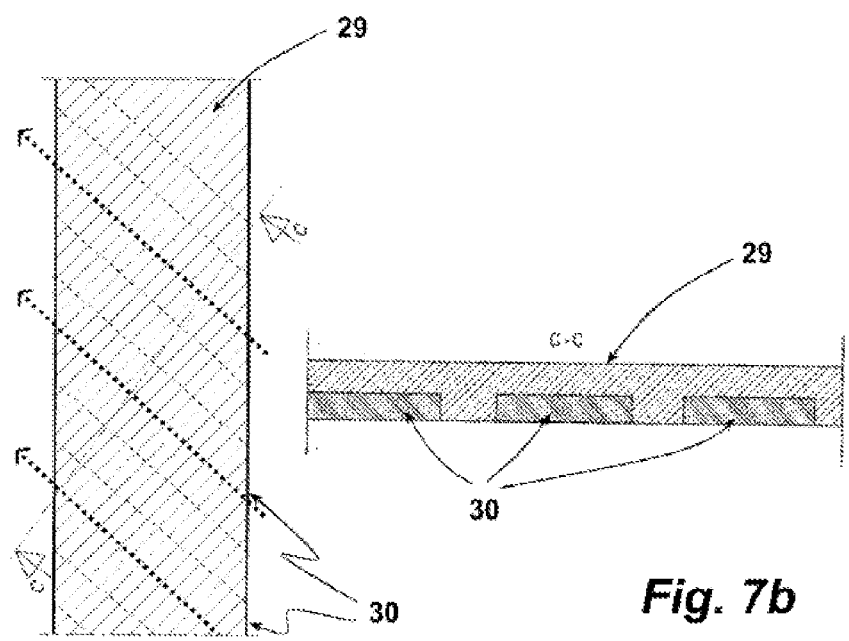
FIGS. 7a, 7b is an insert for an elastic vehicle tire with a noise dampening layer as well as ventilation layers introduced therein.

Yet another embodiment of an arrangement of a noise dampening insert 29 and a ventilation layer 30 is shown in FIGS. 7a, 7b. FIG. 7a shows a top view of the inner surface area of the noise dampening insert 29. The arrangement of several ventilation layers with strip-like design is marked with broken lines and arrows, wherein the layers extend diagonally to the rotation direction which corresponds to the longitudinal extent of the noise dampening insert 29. FIG. 7b shows a cross section along line C-C of FIG. 7a.

The embodiment example of FIGS. 7a, 7b shows that a certain amount of bracing of the noise dampening insert on the inner side of the running strip of a vehicle tire is certainly possible. In the embodiment of FIG. 7a, 7b, the brace is in the shape of a ledge. However, if desired, this brace can also be provided as an islet-shaped brace in the form of columns or individual ledges.

In FIGS. 8a-8g, various arrangements of a unit inserted in an elastic vehicle tire R are shown, each consisting of a ventilation layer V and a noise dampening layer S. The air flows which are generated during the rolling of the tire on a substrate are drawn with broken lines. Due to the sectional position, only air flows generated transversely to the rotation direction of the tire R, or their flow components, can be seen. In all the embodiment examples of FIG. 8 shown, an air flow develops additionally in the peripheral direction of the tire R.

Figure 8A:
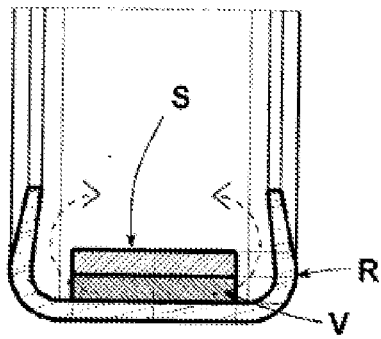
FIGS. 8a-8g are basic representations of different units, each formed by a ventilation layer and a noise dampening insert in diagrammatic partial cross sections through a vehicle tire.

In FIG. 8a, the ventilation layer V has the same width as the noise dampening insert S. This unit is less broad than the inner width provided by the tires R. For this reason, the lateral surfaces which can be seen in FIG. 8a delimit the tire cavity, so that the transverse air flows shown in FIG. 8a can be generated.

Figure 8B:
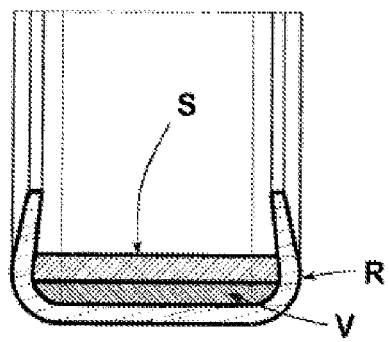

FIG. 8b corresponds substantially to the embodiment example already shown in FIG. 1.

Figure 8C:
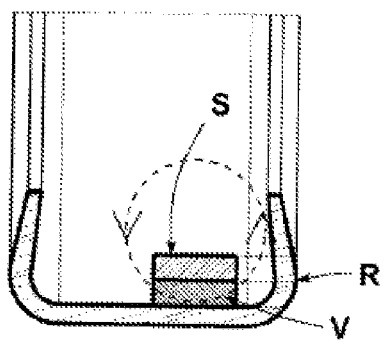

FIG. 8c is an asymmetrical arrangement of a unit formed by ventilation layer V and a noise dampening insert S. The arrangement is asymmetric, because it is arranged eccentrically relative to the center longitudinal plane of the tire R. As drawn in FIG. 8c, an air flow cylinder can be formed in such a design.

Figure 8D:
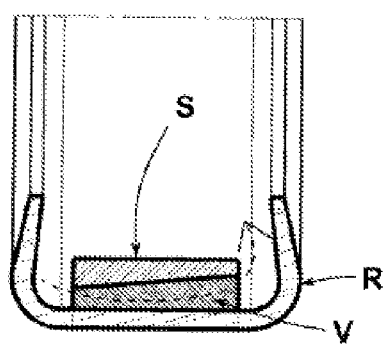

In FIG. 8d, the ventilation layer V of the unit inserted in the tire R is designed with an asymmetric thickness. The thickness of the ventilation layer is greater on one of its sides (on the right in the figure) than on its other side (on the left in the figure). The thickness of the noise dampening insert S shown in the embodiment example is complementarily to this, so that the unit formed by the ventilation unit V and the noise dampening insert S overall has a rectangular cross section. Due to this design of the ventilation layer V formed, a transverse flow directed in one direction (here to the right) typically forms. In contrast to this, in the embodiment example of FIG. 8a, a transverse air flow or a transverse air flow component develops in both directions, i.e., to the left and to the right in the figure.

Figure 8E:
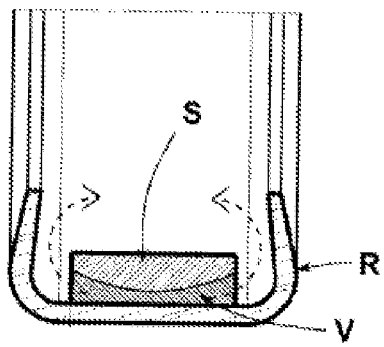

FIG. 8e shows an additional embodiment, which is similar with respect to air flow generation to that of FIG. 8a. The ventilation layer V of this embodiment example is taper cut toward the center, and it increases from the center in the direction of the two lateral closing-off parts.

Figures 8F, 8G:
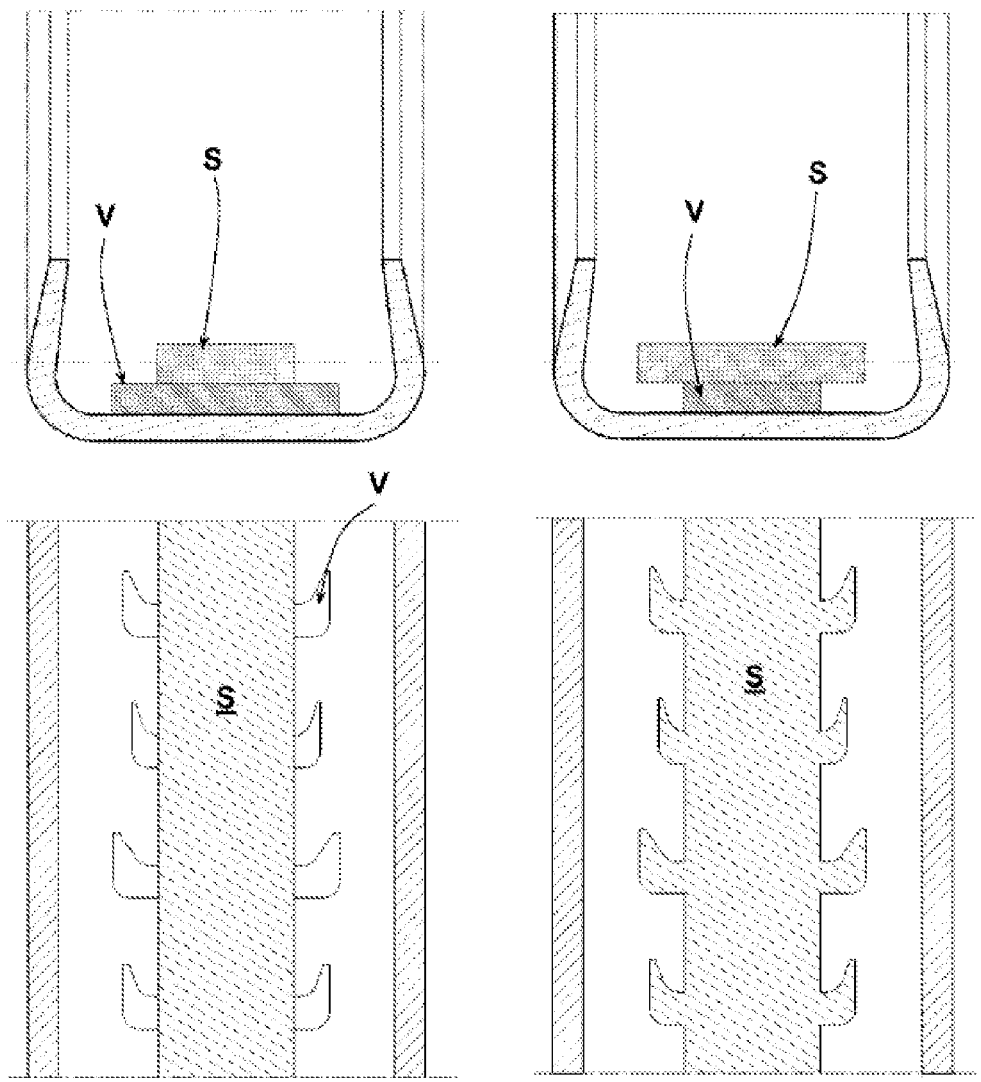

FIG. 8f shows yet another embodiment corresponding basically to that of FIG. 8a. In this embodiment, the ventilation layer V is broader than the noise dampening insert S. The noise dampening insert S in this embodiment is located at the center of the ventilation layer V. In a variant of such a general embodiment, it is possible to provide that the ventilation layer V has, above its periphery, transversely to the turning direction of the tire, viewed in the rotation direction of the tire, protrusions by means of which turbulences are introduced in the generated air flow. In the represented embodiment, the protrusions are designed as bent extensions, wherein the bending is directed against the flow direction of the air in the tire interior. Causing turbulent air flow in the tire interior promotes heat removal from the inner side of the running strip into the interior of the tire.

FIG. 8g shows an embodiment which is similar to that of FIG. 8f. In the embodiment of FIG. 8g, the ventilation layer V has a smaller width than the noise dampening insert 2. The ventilation layer V in this embodiment is arranged at the center relative to the inner side of the running strip and relative to the noise dampening insert S. The noise dampening insert S in the embodiment of FIG. 8g has a geometry as described for the ventilation layer V in the embodiment of FIG. 8f. In this design, the surface of the noise dampening insert S is enlarged, and consequently the noise dampening effect is further improved in addition to the generation of turbulence in the air flow flowing in the tire interior.

Figure 9:
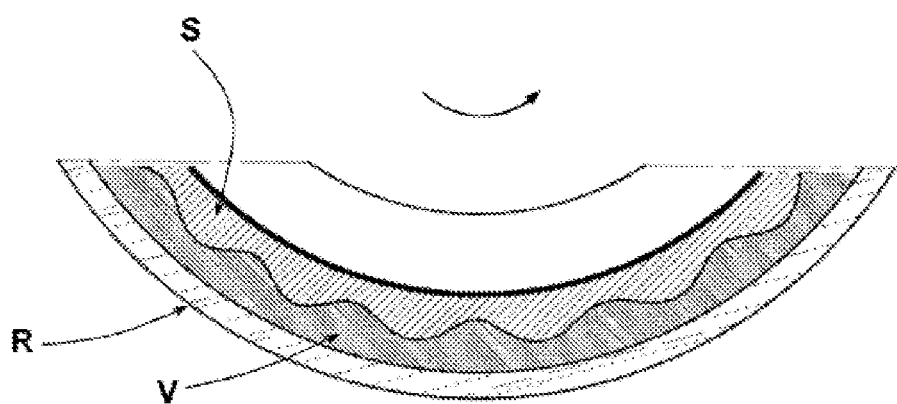
FIG. 9 shows a partial longitudinal section through a vehicle tire with a unit inserted therein, consisting of a ventilation layer and a noise dampening insert.

Yet another embodiment of a unit inserted in a vehicle tire R, consisting of a ventilation layer V and a noise dampening insert S, is shown in FIG. 9. In this design, the noise dampening insert S has a wavy structure pointing in the direction of the inner side of the tire R. This structure is filled by a corresponding complementarily wavy structure on the ventilation layer V. The noise dampening insert S that is designed in this manner has a considerably increased effective surface for the purposes of noise dampening of the insert, and consequently the noise dampening effect is improved.

In all the described embodiment examples, the peristaltic pump activity of the tire due to its deformation during the rolling process is responsible for the generation of the air flow, which is skillfully used for generating the air stream provided in order to cool the inner side of the vehicle tire.

The ventilation layers used in the above-described embodiment examples are layers made of a reticulated polyurethane foam. Such foams are first of all bodies produced as open pore foams having a skeleton that consists of relatively stable fibers, which are connected by thin membranes, the so-called windows. The latter form the cell walls. The reticulation relates to the method used to remove or open these cell walls, and consequently increase the throughflow path. For this purpose, different chemical and thermal methods are known. They are described in U.S. Pat. No. 3,405,217, U.S. Pat. No. 3,423,338, U.S. Pat. No. 3,425,890 or U.S. Pat. No. 4,670,477, for example.

Numerous additional design possibilities for carrying out the invention, which do not need to be described in detail in the context of this explanation, are apparent to a person skilled in the art, without going beyond the scope of the claims. This relates, for example, to the combination of the individual characteristics of the invention, which are explained in relation to each embodiment example.

While a number of exemplary aspects and embodiments have been discussed above, those of skill in the art will recognize certain modifications, permutations, additions and subcombinations therefore. It is therefore intended that the following appended claims hereinafter introduced are interpreted to include all such modifications, permutations, additions and subcombinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

1 Vehicle tire
2 Running strip
3 Tire tread
4, 4.1 Side wall
5, 5.1 Bead
6 Rim
7 Wheel
8, 8.1 Rim edge
9 Foam insert
10 Inner side
11 Cavity
12, 12.1 Side wall section
13 Ventilation layer
14 Perforation
15 Ventilation layer
16 Noise dampening insert
17 Ventilation layer
18 Noise dampening insert
19 Noise dampening insert
20 Ventilation layer
21 Ventilation layer
22 Noise dampening insert
23 Ventilation layer 24 Noise dampening insert
25 Noise dampening insert arrangement
26 Ventilation layer
27 Noise dampening insert
28 Ventilation layer
29 Noise dampening insert
30 Ventilation layer
A Footprint
R Tire
P Opening (perforation)
S Noise dampening insert
V Ventilation layer

The invention claimed is:

1. An elastic pneumatic vehicle tire comprising:
a cavity formed by a running strip supporting a tread surface, and two side walls extending from each side of the running strip;
at least one noise damping insert of foam arranged in the cavity;
a ventilation layer between the noise damping insert and an inner side of the running strip of the tire, said ventilation layer extending and connected to the running strip in the peripheral direction of the running strip and providing a direct air permeable connection between the inside of the running strip and the tire cavity;
the ventilation layer having an air permeability of more than 1000 l/min over a cross-sectional area of 1 dm$^2$ and a thickness of 1 cm according to EN-ISO 09237;
the ventilation layer formed such that air can flow through the ventilation layer in the transverse and/or longitudinal direction of the running strip and allows the passage of a direct air flow into the cavity, said air flow being at least partially in contact with the inner wall of the running strip;
the ventilation layer having elastic properties in at least a radial direction and the ventilation layer has substantially no noise dampening properties;
the ventilation layer being more easily deformable than the noise dampening insert, such that an air flow is generated within the ventilation layer as the tire rolls on a substrate according to the principles of a peristaltic pump; and
the ventilation layer being in contact with and connected to the inner side of the running strip.

2. The tire of claim 1, wherein the noise damping insert has perforations forming an air flow connection between the ventilation layer and the remaining tire cavity.

3. The tire of claim 1 wherein a portion of the surface the ventilation layer area delimits the remaining cavity.

4. The tire of claim 1 wherein the ventilation layer is formed at least partially from a heat conducting material, for example, a metal fiber, optionally connected to a metal nonwoven, or a metal mesh.

5. The tire of claim 1 wherein the ventilation layer is formed from an open pore foam body.

6. The tire of claim 5 wherein the ventilation layer is formed from an open pore polyurethane foam body, in particular as a reticular foam body.

7. The tire of claim 1 wherein the ventilation layer has a peripheral design extending in the peripheral direction, and as a result an air flow path is made available which is peripheral and arranged on the inner side of the running strip.

8. The tire of claim 1 wherein the ventilation layer has an extent in the direction transverse to the peripheral direction, which corresponds substantially to the width of the tire tread.

9. The tire of claim 1 wherein the noise damping insert is enclosed in the material of the ventilation layer.

10. The tire of claim 9 wherein a unit formed by the noise damping insert and the ventilation layer is applied under a certain preliminary stress in the standing position with force-fitting connection on the inner side of the tire.

11. The tire of claim 1 further comprising several mutually parallel ventilation layers.

12. The tire of claim 1 wherein a unit formed by a ventilation layer and a noise damping insert is arranged eccentrically relative to a center longitudinal plane of the tire.

13. The tire of claim 1 wherein a thermally conducting layer is arranged between the ventilation layer and the inner side of the running strip, said thermally conducting layer functioning to removing heat from the inner side of the running strip into the cavity and wherein the thermally conducting layer extends at least in sections into the tire cavity to radiate heat.

14. The tire according to claim 1 wherein the noise dampening insert is substantially not air permeable.

15. The tire according to claim 1 wherein the noise dampening insert is substantially not air permeable.

16. An elastic vehicle tire comprising:
A cavity formed by a running strip supporting a tread surface, and two side walls extending from each side of the running strip;
at least one noise damping insert arranged in the cavity;
a ventilation layer between the noise damping insert and an inner side of the running strip of the tire, said ventilation layer extending in the peripheral direction of the running strip and providing an air permeable connection between the inside of the running strip and the tire cavity;
the ventilation layer formed such that air can flow through the ventilation layer in the transverse and/or longitudinal direction of the running strip and allows the passage of an air flow, said air flow being at least partially in contact with the inner wall of the running strip;
the ventilation layer having elastic properties in at least a radial direction;
wherein the noise damping insert has perforations forming an air flow connection between the ventilation layer and the remaining tire cavity;
the ventilation layer being more easily deformable than the noise dampening insert, such that an air flow is generated within the ventilation layer as the tire rolls on a substrate according to the principles of a peristaltic pump.

* * * * *